(12) United States Patent
Shimazawa

(10) Patent No.: US 8,369,191 B2
(45) Date of Patent: Feb. 5, 2013

(54) METHOD FOR CONTROLLING THE CURRENT OF LASER DIODE ON THERMALLY ASSISTED MAGNETIC RECORDING HEAD

(75) Inventor: Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 261 days.

(21) Appl. No.: 12/955,012

(22) Filed: Nov. 29, 2010

(65) Prior Publication Data

US 2012/0134246 A1    May 31, 2012

(51) Int. Cl.
*G11B 11/00* (2006.01)

(52) U.S. Cl. ............ 369/13.26; 369/13.33; 369/13.13

(58) Field of Classification Search .......... 369/13.26, 369/13.33, 13.32, 13.13, 13.17, 13.02, 112.09, 369/112.14, 112.21, 112.27, 300; 360/59; 385/129, 31, 88–94; 29/603.07–603.27; 250/201.3, 201.5

See application file for complete search history.

(56) References Cited

U.S. PATENT DOCUMENTS

| | | | |
|---|---|---|---|
| 4,819,241 A | 4/1989 | Nagano | |
| 6,331,966 B1 * | 12/2001 | Minami et al. | 369/13.26 |
| 7,470,886 B2 | 12/2008 | Shimizu et al. | |
| 8,264,917 B2 * | 9/2012 | Nakano et al. | 369/13.26 |
| 8,279,720 B2 * | 10/2012 | Kimura | 369/13.26 |
| 2006/0262668 A1 * | 11/2006 | Huang et al. | 369/13.26 |
| 2008/0043360 A1 | 2/2008 | Shimazawa et al. | |
| 2009/0040645 A1 * | 2/2009 | Shimazawa et al. | 369/13.33 |
| 2009/0225464 A1 * | 9/2009 | Juang et al. | 369/13.33 |
| 2010/0103553 A1 | 4/2010 | Shimazawa et al. | |
| 2010/0202081 A1 | 8/2010 | Shimazawa et al. | |
| 2011/0228651 A1 * | 9/2011 | Gage et al. | 369/13.26 |
| 2011/0299367 A1 * | 12/2011 | Naniwa et al. | 369/13.33 |
| 2012/0051196 A1 * | 3/2012 | Grobis et al. | 369/13.24 |

* cited by examiner

*Primary Examiner* — Tan X Dinh
(74) *Attorney, Agent, or Firm* — Posz Law Group, PLC

(57) ABSTRACT

A hard disk drive includes a recording medium and a thermally assisted type magnetic head. The controller determines one output current of a photodiode as a first saturated output current, the one output current being defined where temperature measured by a temperature sensor is a first temperature and where signal-to-noise-ratio (SNR) of the reproducing signal current of the reproducing element is saturated with respect to an increase in output current of the photodiode, and another output current of the photodiode as a second saturated output current, the another output current being defined where temperature measured by the temperature sensor is a second temperature, which is different from the first temperature, and where SNR of the reproducing signal current of the reproducing element is saturated with respect to an increase in the output current of the photodiode. A target saturated output current at operation temperature is estimated from operation temperature measured by the temperature sensor during the hard disk device operation, the first and second temperatures, and the first and second saturated output currents; and the driving current of the laser diode is controlled in order to obtain the estimated target saturated output current.

5 Claims, 10 Drawing Sheets

METHOD FOR CONTROLLING THE CURRENT OF LASER DIODE ON THERMALLY ASSISTED MAGNETIC RECORDING HEAD

BACKGROUND OF THE INVENTION

1. Field of the Invention

The present invention relates to a hard disk device (hard disk drive apparatus) with a thermally assisted head and especially relates to a driving current control mechanism of a laser diode.

2. Description of the Related Art

In accordance with high recording density of a hard disk device, performance improvement in a thin film magnetic head is demanded. As the thin film magnetic head, a composite type thin film magnetic head is widely utilized that has a configuration in which a reproducing head having a magneto resistance effect element (MR element) for reading and a reading head having an inductive electromagnetic transducer for writing are laminated.

A recording medium for magnetic recording is made from a discontinuous medium where magnetic micro particles are assembled, and each magnetic micro particle has a single magnetic domain structure. Since a recording area (each bit) is composed of a plurality of the magnetic micro particles, the recording area has an asperity-shaped-boundary. In order to enhance the recording density, the asperity of the boundary of the recording area has to be reduced. For that, it is effective to reduce the size of the magnetic micro particles; however, if the magnetic micro particles are reduced in size, thermal stability is reduced due to the decrease in volume of the magnetic micro particles. In order to increase the thermal stability, it is preferred to utilize a magnetic material having a large magnetic anisotropy constant Ku; however, it becomes difficult to record information with a conventional magnetic head because coercive force of the recording medium increases when anisotropy energy of the magnetic micro particles is increased. To solve this problem, a method is proposed in which recording is performed when coercive force is reduced by simultaneously applying a magnetic field and heat at the time of recording. Such a method is referred to as thermally assisted magnetic recording. The thermally-assisted magnetic recording is similar to optical magnetic recording; however, the space resolution is realized by light in the optical magnetic recording, on the other hand, the space resolution is realized by a magnetic field in the thermally assisted magnetic recording.

As an example of such thermally assisted magnetic recording, in the specification of U.S. 2010/0202081, a thermally assisted head that includes a surface-emitting laser diode and a photodiode is disclosed. Laser light emitted from the laser diode is introduced into a waveguide. A plasmon antenna disposed at a tip of the waveguide generates near field light, and a recording medium is heated. Simultaneously, magnetic flux is supplied from a main pole of a recording part to the recording medium, and information is recorded to the recording medium while coercive force is reduced. A portion of the laser light emitted from the surface-emitting laser diode is detected by the photodiode.

Generally, characteristics and especially light strength of laser diodes are highly variable. Even when the same driving current is applied, the light strength widely varies for each laser diode. In the case of a shortage of light strength, it is difficult to record information because coercive force is not sufficiently reduced. In the case of excessive light strength, an area where temperature increases due to the laser light widens, and a track width is increased, resulting in restriction of high density recording. Therefore, an adjustment, which will be described below, may be performed to suppress effects due to the variation of the light strength of the laser diode.

Specifically, before shipping the hard disk device from a factory or at a first stage at which a user uses the hard disk device, the hard disk device "learns" the most appropriate recording power. There is an example of a learning process in which a relationship between output current of the photodiode and a signal-to-noise-ratio (SNR) is acquired. The output current of the photodiode is the light strength that the photodiode monitors while increasing the driving current of the laser diode, and the SNR is a ratio of signal with respect to noise of a reproducing signal. More specifically, information is recorded to a recording medium while increasing the driving current of the laser diode, and the recorded information is read by a reproducing element. The reproducing element generates a reproducing signal current that corresponds to the recorded magnetic information. By analyzing the reproducing signal current, the SNR is calculated and determined.

By increasing the driving current of the laser diode, the SNR of the reproducing signal current reaches a saturated point. As described above, the output current of the photodiode that is defined where the SNR reaches the saturated point is learned and is stored in a memory. During use of the hard disk device, the driving current to be applied to the laser diode is controlled to obtain the learned output current of the photodiode. By determining the recording power with such a method, the variation of the light strength among laser diodes is suppressed, and it becomes possible that a sufficient SNR is obtained for every laser diode. Also, when the output current of the photodiode at the saturated point is used to control the driving current of the laser diode, application of excessive driving current to the laser diode is prevented.

However, an environment of the hard disk device, and specifically an internal temperature of a housing of the hard disk device, varies not only by the installation environment of the hard disk device itself but also by operation condition of the hard disk device. Specifically, as the internal temperature of the housing varies, the required recording power varies. Therefore, when the "learned" output current of the photodiode is used to control the driving current of the laser diode and when the internal temperature of the housing at the time of learning and the internal temperature of the housing at the operation time widely vary, it may not be possible to obtain the appropriate recording power.

It is an object of the present invention to provide a hard disk device that may heat the recording medium at a proper temperature even when the internal temperature of the housing varies, and that includes a thermally assisted type recording element. Also, it is an object of the present invention to provide a control method for such a hard disk device.

SUMMARY OF THE INVENTION

According to an embodiment of the present invention, a hard disk drive includes: a recording medium; a magnetic head including a laser diode that emits laser light, a photodiode that measures light strength of the laser light emitted from the laser diode, a near field generator that generates near field light from the laser light emitted from the laser diode at an air bearing surface facing the recording medium, a main pole for recording that is disposed adjacent to the near field generator and having a tip part positioned at the air bearing surface, and a reproducing element; a housing incorporating the recording medium and the magnetic head; a temperature sensor that measures temperature inside the housing; and a controller. The controller includes: means for recording information to the recording medium by the main pole as the near field generator generates near field light, while varying driving current of the laser diode and observing output current of the photodiode; means for reproducing the recorded information with the reproducing element and for obtaining reproducing signal current; means for determining one output current of the photodiode as a first saturated output current, the one output current being defined where temperature measured by the temperature sensor is a first temperature and where signal-to-noise-ratio (SNR) of the reproducing signal current of the reproducing element is saturated with respect to an increase in the output current of the photodiode; means for determining another output current of the photodiode as a second saturated output current, the another output current being defined where temperature measured by the temperature sensor is a second temperature, which is different from the first temperature, and where SNR of the reproducing signal current of the reproducing element is saturated with respect to an increase in the output current of the photodiode; means for estimating a target saturated output current at operation temperature from the operation temperature measured by the temperature sensor during the hard disk device operation, the first and second temperatures, and the first and second saturated output currents; and means for controlling the laser diode that controls the driving current of the laser diode in order to obtain the estimated target saturated output current.

Another embodiment of the present invention relates to a method for controlling a hard disk drive that includes: a recording medium; a magnetic head including a laser diode that emits laser light, a photodiode that measures light strength of the laser light emitted from the laser diode, a near field generator that generates near field light from the laser light emitted from the laser diode at an air bearing surface facing the recording medium, a main pole for recording that is disposed adjacent to the near field generator and that has a tip part positioned at the air bearing surface, and a reproducing element; and a housing incorporating the recording medium. The method includes: recording information to the recording medium by the main pole as the near field generator generates near field light while varying driving current of the laser diode, and monitoring the output current of the photodiode with respect to light strength of the laser light where temperatures inside the housing are the first temperature and the second temperature that is different from the first temperature respectively, reproducing the recorded information by the reproducing element and obtaining reproducing signal current; determining the output currents of the photodiode as first and second saturated output currents, the output currents being defined where signal-to-noise-ratio (SNR) of the reproducing signal current of the reproducing element at the first and second temperatures are respectively saturated with respect to an increase in the output current of the photodiode; measuring the temperature inside the housing during the hard disk device operation as operation temperature; estimating a target saturated output current at the operation temperature from the operation temperature, the first and second temperatures, and the first and second saturated output currents; and controlling the driving current of the laser diode in order to obtain the estimated target saturated output current.

The first saturated output current and the second saturated output current are measured at the first temperature and the second temperature that is different from the first temperature, and the target saturated output current at the operation temperature is estimated based thereon. Therefore, compared to a case where the driving current of the laser diode is controlled using the saturated output current measured at one temperature, the target saturated output current at the operation temperature is adjusted to a desired value. Therefore, a high SNR is obtained, and an excessive increase in the track width is prevented.

The above mentioned objects, features, and advantages of the present invention and other objects, features, and advantages will be disclosed by the following descriptions referring to the figures illustrating embodiments of the present invention.

DETAILED DESCRIPTION OF THE INVENTION

Figure 1A:
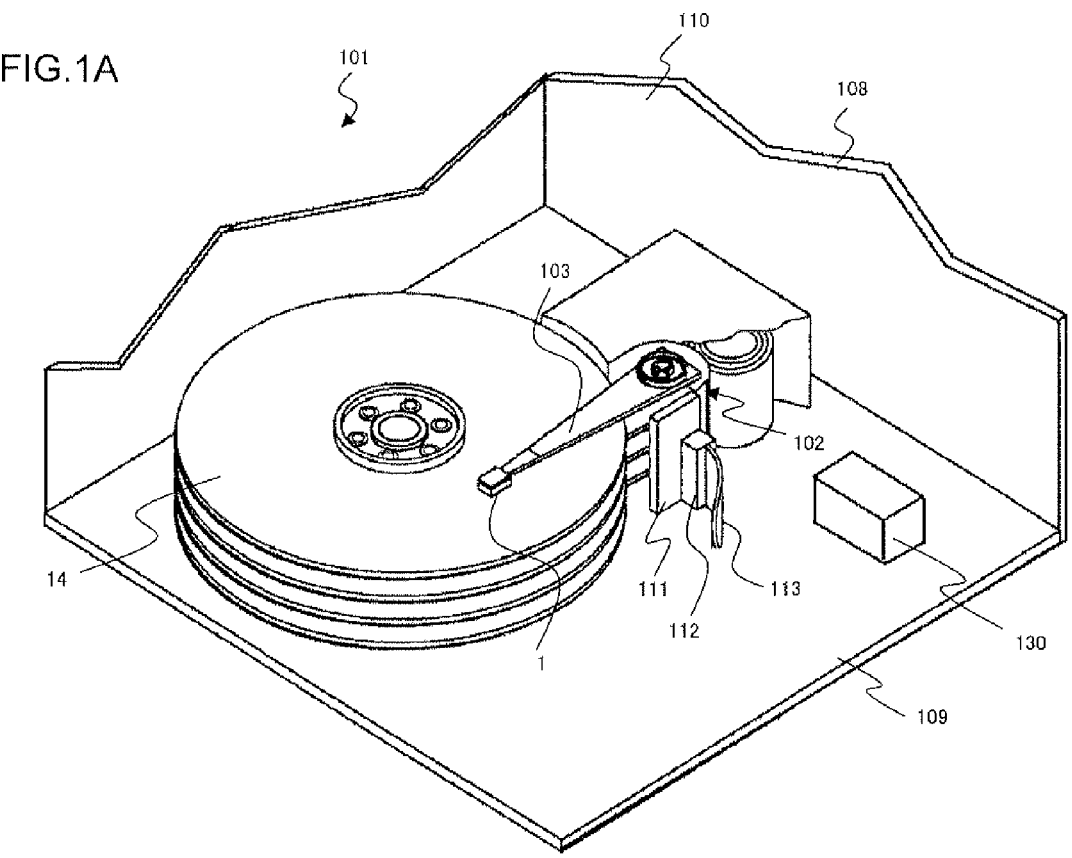
FIG. 1A is a conceptual partial cut-away perspective view of a hard disk device.
Figure 1B:
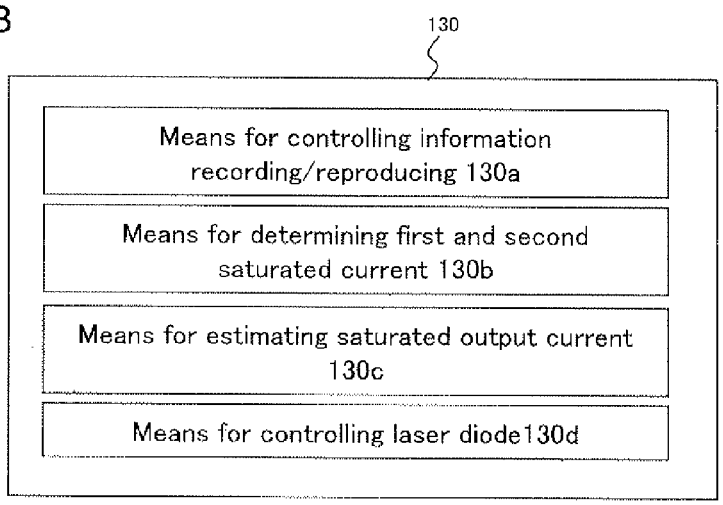
FIG. 1B is a conceptual configuration view of a controller of the hard disk device.
Figure 2:
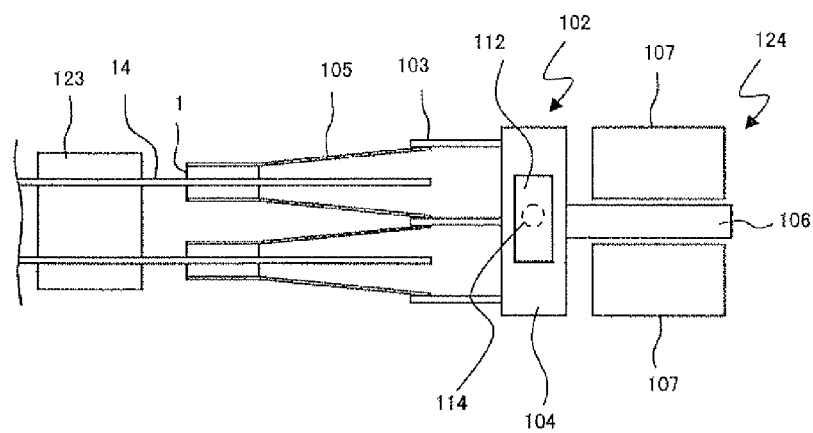
FIG. 2 is a partial cross-sectional view of the hard disk device illustrated in FIG. 1.
Figure 3:
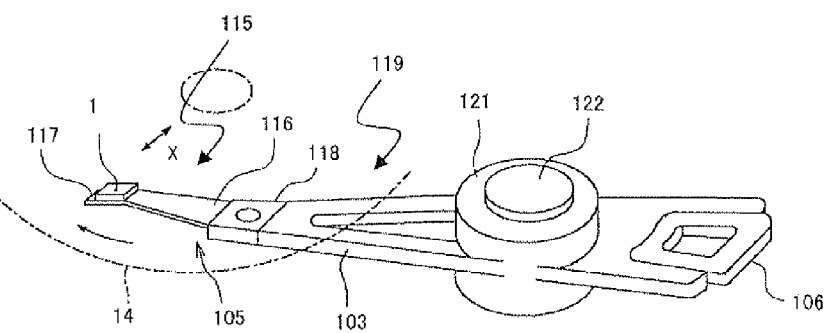
FIG. 3 is a perspective view of a head arm assembly that includes a head gimbal assembly in which a magnetic head is incorporated.

Hereafter, embodiments of a hard disk device of the present invention will be explained referring to the figures. Referring to FIGS. 1 and 2, a hard disk device 101 includes a plurality of recording mediums 14 attached to a spindle motor 123 and a head stack assembly 102. It is possible that only one recording medium 14 is attached. The recording medium 14 has a configuration for perpendicular magnetic recording. The head stack assembly 102 includes a carriage 104 that includes a plurality of arms 103. A head gimbal assembly 105 is attached to each of the arms 103. On an opposite side from the arms 103 with respect to the carriage 104, a coil 106 which is to be a part of a voice coil motor 124 is attached. The voice coil motor 124 includes permanent magnets 107 positioned in a manner of facing each other and sandwiching the coil 106.

The hard disk device 101 includes a housing 108. The housing 108 contains at least the recording medium 14 and the head stack assembly 102 including a magnetic head 1. A configuration of the housing 108 is not particularly limited. As one example, the housing 108 is configured with a base plate 109 for pinning the recording medium 14 and the head stack assembly 102, and a cover 110 that covers them.

On a side of the head stack assembly 102, a preamplifier 112 is attached through a supporting plate 111. The preamplifier 112 amplifies a reproducing output signal before a minute reproducing output signal read by a reproducing element of the magnetic head 1 is transmitted externally from the hard disk device 101 via an intermediate flexible printed circuit 113. The preamplifier 112 incorporates a temperature sensor 114 that measures in-housing temperature. It is also possible to attach a temperature sensor that is different from the temperature sensor 114 incorporated in the preamplifier 112. The hard disk device 101 further provides a CPU (Central Processing Unit), a memory, etc., and includes a controller 130 that controls the performance of the hard disk device 101 and an interface with external connected devices.

The head gimbal assembly 105 includes the magnetic head 1 and a suspension 115 that elastically supports the magnetic head 1. The suspension 115 includes a load beam 116, a flexure 117, and a base plate 118. The load beam 116 is formed in a plate spring shape and is made of stainless steel. The flexure 117 is attached to one edge part of the load beam 116. The base plate 118 is attached to the other edge part of the load beam 116. The flexure 117 is joined to the magnetic head slider 2 of the magnetic head 1 to give the magnetic head 1 suitable flexibility.

The arm 103 moves the magnetic head 1 in a track crossing direction x of the recording medium 14. The base plate 118 is attached to one edge of the arm 103. A bearing part 121 is arranged in the middle section of the arm 103. The arm 103 is rotatably supported by a shaft 122 mounted on the bearing part 121. A head arm assembly 119 is configured with the arm 103 and the head gimbal assembly 105.

The magnetic head 1 is positioned in the hard disk device 101 such that the magnetic head 1 faces the recording medium 14, which has a disk shape and is rotatably driven. For each of the recording mediums 14, two of the magnetic heads 1 are positioned to face each other and sandwich the recording medium 14. The head stack assembly 102, excluding the magnetic head 1, and the voice coil motor 124 support the magnetic head 1, move the magnetic head 1 in the track crossing direction x of the recording medium 14, and perform a positioning with respect to the recording medium 14.

Figure 4:
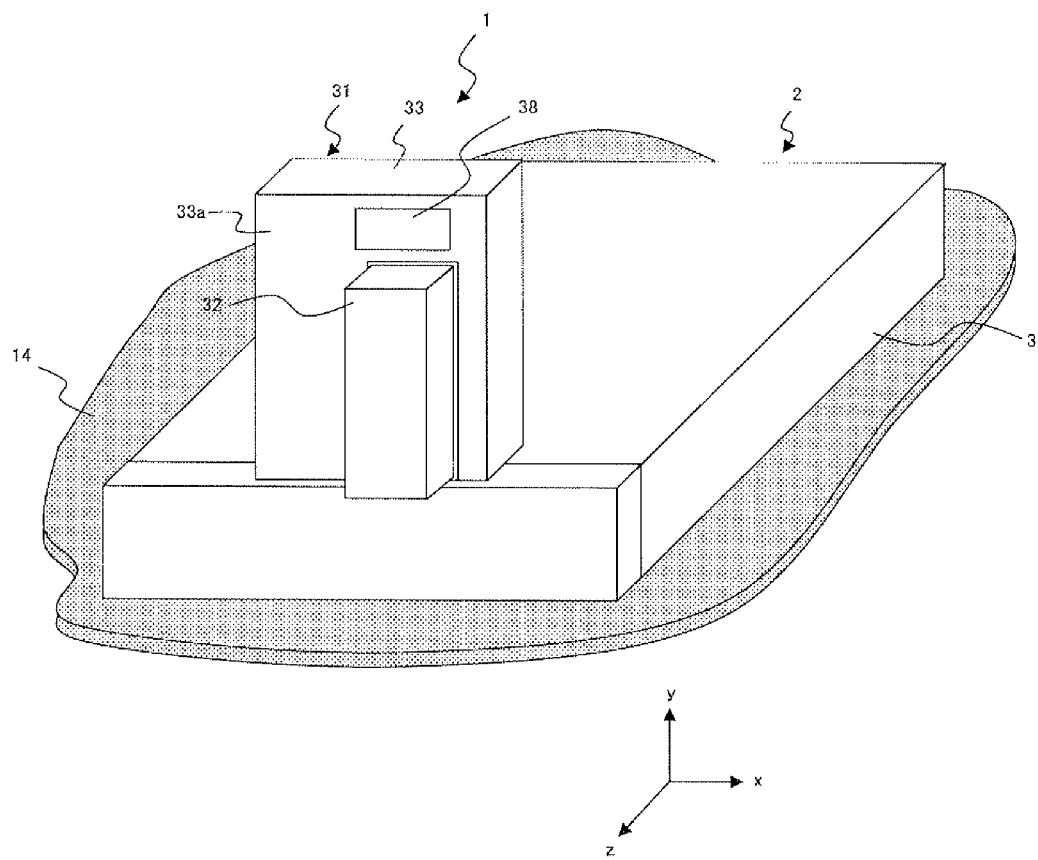
FIG. 4 is a conceptual perspective view of the magnetic head.
Figure 5:
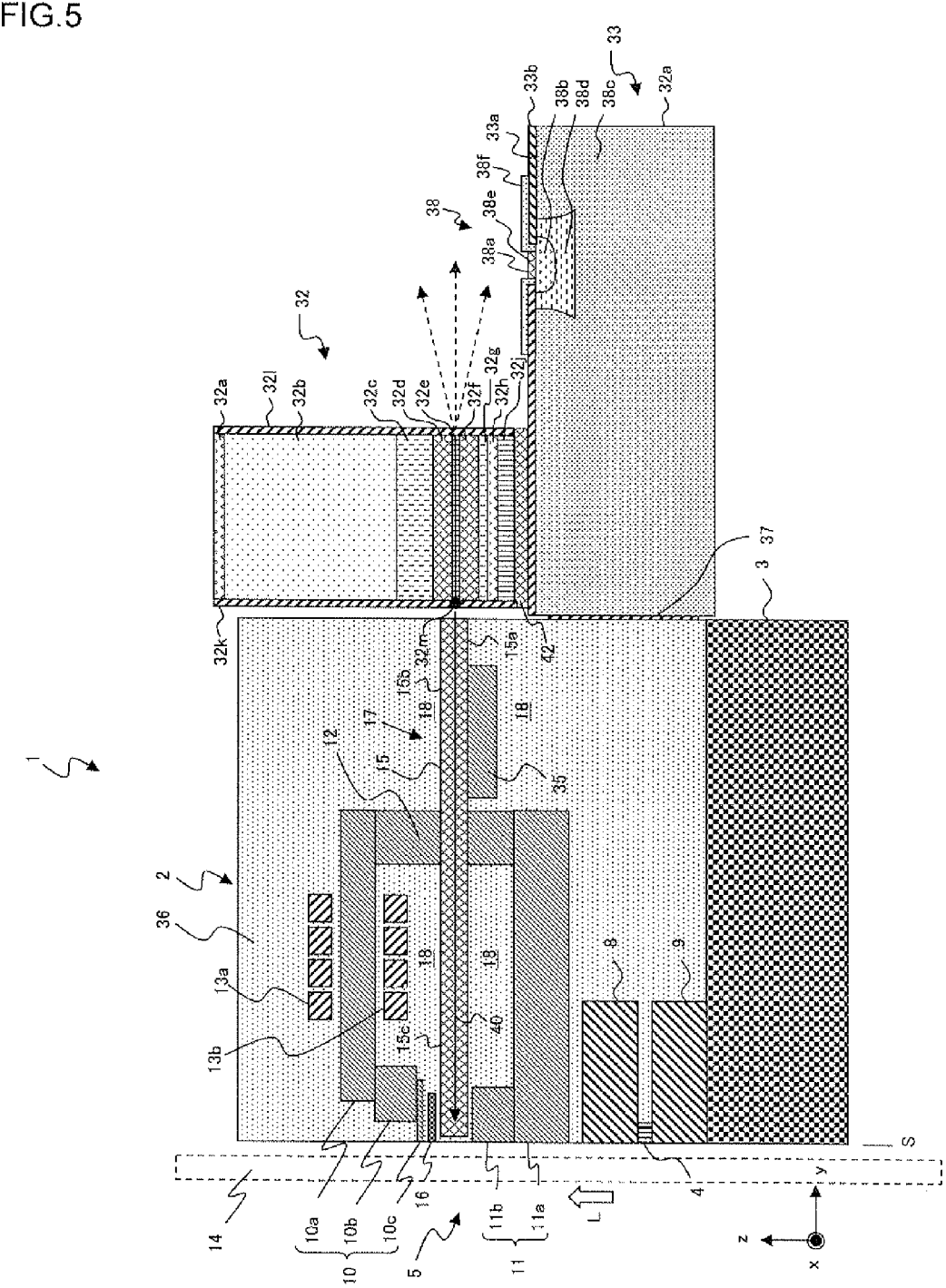
FIG. 5 is a main part cross-sectional view of the magnetic head illustrated in FIG. 4.
Figure 6:
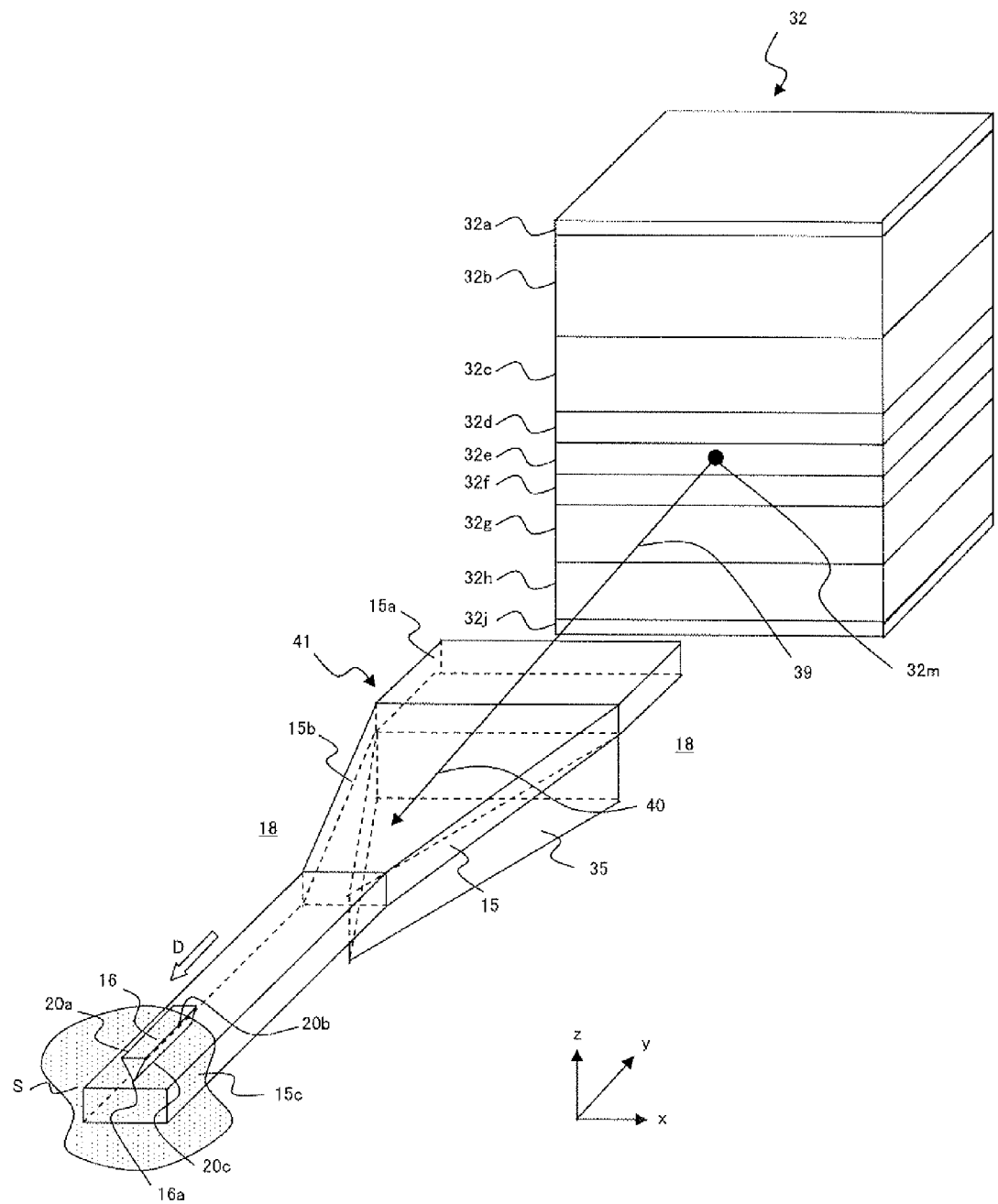
FIG. 6 is a conceptual perspective view of a near field generator and a laser diode.

Next, the configuration of the magnetic head will be explained referring to FIGS. 4-6. FIG. 4 is a total perspective view of the magnetic head. FIG. 5 is a main part cross-sectional view of the magnetic head. FIG. 6 is a perspective view illustrating an extracted near field generator and laser diode. In this specification, a lamination direction L means a film formation direction in a wafer process and corresponds to the z-direction in each of the drawings. "Upward lamination direction" means a direction oriented toward an overcoat layer 36 from a substrate 3, and "downward lamination direction" means a direction oriented toward the substrate 3 from the overcoat layer 36.

The magnetic head 1 includes a magnetic head slider 2, and a laser diode unit 31 that emits laser light and that is fixed to the magnetic head slider 2.

The magnetic head slider 2 has an approximately hexahedral shape, and one surface of the six outer surfaces is an air bearing surface S facing the recording medium 14. The magnetic head slider 2 includes an MR element (reproducing element) 4, a magnetic recording element 5 including a main pole 10 for recording, a waveguide 17 through which the laser light emitting from the laser diode unit 31 propagates as propagation light, and a near field generator 41 that generates near field light from the propagation light on the air bearing surface S. The main pole 10 is disposed adjacent to the near field generator 41 and a tip part thereof is positioned on the air bearing surface S. These elements are formed above the substrate 3.

The laser diode unit 31 is positioned on a surface of an opposite side from the air bearing surface S of the magnetic head slider 2. The laser diode unit 31 emits the laser light toward the waveguide 17 of the magnetic head slider 2 in a direction perpendicular to the air bearing surface S. The laser diode unit 31 is soldered to the magnetic head slider 2 by a bonding layer 37.

The magnetic head slider 2 includes the MR element 4 positioned such that a tip part is exposed to the air bearing surface S, and an upper shield layer 8 and a lower shield layer 9 that are disposed in a manner of sandwiching the MR element 4 from both upper and lower sides in the lamination direction. These elements configure a reproducing head part. An arbitrary configuration in which the magneto resistance effect is used may be applied to the MR element 4 such as a current in plane—giant magneto resistive (CIP-GMR) element where sense current flows in a direction (x-direction) parallel to a film surface, a current perpendicular to plane—giant magneto resistive (CPP-GMR) element where the sense current flows in a direction (z-direction) perpendicular to the film surface, a tunneling magneto resistive (TMR) element for which a tunnel effect is used, etc. When the CPP-GMR element and the TMR element are applied, the upper shield layer 8 and the lower shield layer 9 are used as electrodes to supply the sense current.

The magnetic head slider 2 includes a magnetic recording element 5 for a so-called perpendicular magnetic recording, which configures a recording head part. The magnetic recording element 5 includes a main pole 10 for recording. The main pole 10 is disposed adjacent to a plasmon generator 16, which will be described later. The main pole 10 includes a first body part 10a, a second body part 10b, and a magnetic pole tip part 10c, all of which are made of an alloy etc., which is made of any two or three of Ni, Fe, and Co. The magnetic pole tip part 10c, which is the tip part of the main pole 10 is positioned facing the air bearing surface S. A return shield layer 11 is disposed in the laminating direction lower part of the main pole 10. The return shield layer 11 includes a first body part 11a and a second body part 11b, both of which are also made of an alloy etc., which is made of two or three of Ni, Fe, Co. The main pole 10 and the return shield layer 11 are magnetically connected with each other by a contact part 12. An overcoat layer 36 made of $Al_2O_3$ is formed at the laminating direction upper part of the main pole 10.

Coils 13a and 13b are wound around the main pole 10 centering on the contact part 12. In FIG. 5, only a part on the air bearing surface S side with respect to the contact part 12 is illustrated. A magnetic flux is generated at the main pole 10 by current applied to the coils 13a and 13b from the outside. The coils 13a and 13b are formed of a conductive material, such as Cu, etc. The coils 13a and 13b are established in a configuration of two layers in the present embodiment, but one layer or three layers or more are also acceptable. Further, the number of windings is four in the present embodiment, but are not limited to this.

The main pole 10 is tapered at the magnetic pole tip part 10c in the vicinity of the air bearing surface S not only in the film surface orthogonal direction (z-direction) but also in the track width direction (x-direction). The magnetic flux generated at the main pole 10 is tapered as it travels to the air bearing surface S, and is discharged as a minute and strong magnetic flux for writing corresponding to the high recording density toward a recording medium 14 from the magnetic pole tip part 10c positioned on the air bearing surface S. The magnetic flux discharged from the magnetic pole tip part 10c travels in the recording medium 14 and magnetizes each recording bit in the perpendicular direction. The magnetic flux changes a magnetic path thereof to the in-plane direction (z-direction) of the recording medium 14, further changes the direction to the perpendicular direction (y-direction) again in the vicinity of the return shield layer 11, and is absorbed by the return shield layer 11.

The second body part 11b of the return shield layer 11 forms a trailing shield part whose layer cross section is wider in the track width direction (x-direction) than the first body part 11a. The placement of the return shield layer 11 causes a steep gradient in the magnetic field between the return shield layer 11 and the main pole 10 in the vicinity of the air bearing surface S. As a result, signal output jitter is reduced and an error rate at the time of reading is decreased.

The magnetic head slider 2 includes a near field generator 41 that generates near field light. The near field generator 41 includes a core 15 through which laser light 39 generated in the laser diode unit 31 propagates as propagation light 40, a cladding 18 that covers the core 15 and that has a smaller refractive index than the core 15, and a plasmon generator 16 that, facing a part of the core 15 and extending to the air bearing surface S along the core 15, generates the near field light on the air bearing surface S. The core 15 and the cladding 18 configure the waveguide 17.

The laser light 39 generated in the laser diode unit 31 propagates through the core 15 as the propagation light 40. The magnetic head 1 generates the near field light by the near field generator 41 on the air bearing surface S, and thereby the recording portion of the recording medium 14 is heated. A method in which the near field light is directly generated from the propagation light propagating through the core with a conductive plate-shaped member or a method in which the near field light is indirectly generated with a plasmon generator 16 (illustrated) may also be applied to the near field generator 41. The following explanation describes an embodiment in which the plasmon generator 16 is utilized.

The core 15 extends from an edge part that faces the laser diode unit 31 of the magnetic head slider 2 to the air bearing surface S or a vicinity thereof. A cross section of the core 15 that is orthogonal to the propagation direction D of the propagation light 40 is rectangular. "Thickness" of the core 15 indicates a size in the z-direction, and "width" of the core 15 indicates a size in the x-direction. The core 15 is arranged to have a width that is larger than its thickness.

When the wavelength of the laser light (propagation light) is 600 nm, the cladding 18 can be formed, for example, of $SiO_2$ and the core 15 may be formed, for example, of $Al_2O_3$. When the cladding 18 is formed of $Al_2O_3$, the core 15 may be formed, for example, of tantalum oxide (TaOx). When the wavelength of the laser light (propagation light) is 800 nm, the cladding 18 can be formed, for example, of $Al_2O_3$ and the core 15 can be formed, for example, of TaOx. TaOx means titanium oxide with any composition herein, and $Ta_2O_5$, TaO, $TaO_2$ or the like is the typical; however it is not limited to these typical examples.

A cross section narrowing part 15b is formed in the vicinity of a starting point 15a of the core 15. The cross section of the cross section narrowing part 15b gradually narrows along the propagating direction D of the propagation light 40. Specifically, the cross section narrowing part 15b has a trapezoidal planar surface shape with a constant thickness and narrowing width. The laser light that is introduced into the core 15 as the propagation light 40 is narrowed in a spot diameter at the cross section narrowing part 15b.

The core 15 preferably includes a spot size converter 35 that tapers the spot diameter of the propagation light 40. The spot size converter 35, being in a triangular prism shape, is formed of the same material as the core 15 in an integrated manner with the core 15. It is possible to narrow the spot diameter only at the cross section narrowing part 15b; however, a placement of the spot size converter 35 enables the spot diameter to be tapered more efficiently.

The core 15 on the other edge 15c side extends between the main pole 10 and the return shield layer 11. The core 15 ends in the vicinity of the air bearing surface S; however, the core 15 may also extend to the air bearing surface S. Although not illustrated in the drawings, the cladding 18 is disposed between the core 15 and the contact part 12.

The plasmon generator 16 extends to the air bearing surface S as facing a part of the core 15. The plasmon generator 16 is formed of Au, Ag, Cu, Al, Pd, Ru, Pt, Rh, Ir or of an alloy consisting primarily of these metals. The plasmon generator 16 is a metallic piece having a mostly-triangular prism shape with triangular cross sections. Three apexes of the plasmon generator 16 on the triangular cross section that is orthogonal to the y-direction form respectively three edges 20a, 20b and 20c extending along the longitudinal direction (y-direction) of the plasmon generator 16. Thus, the plasmon generator 16 is formed so as to have one apex on the triangular cross section facing the core 15, and this apex forms the propagation edge 20c facing the core 15. A portion where the propagation edge 20c overlaps the core 15 is coupled with the propagation light 40 propagating through the core 15 in a surface plasmon mode, and generates surface plasmon. The generated surface plasmon propagates to an edge part 16a of the plasmon generator 16 through the propagation edge 20c, and the near field light is generated in the air bearing surface S.

The laser diode unit 31 includes a laser diode (or light emitting diode) 32 and a submount 33 on which the laser diode 32 is mounted. The submount 33 is made with a Si base and an upper surface thereof is covered with an insulation layer 33b that is made of SiO2.

The laser diode 32 is an edge emitting type, and laser diodes that are usually used for communication, optical disk storage or material analysis, such as laser diodes which are InP-based, GaAs-based, and GaN-based or the like, are applicable. A wavelength of the radiated laser light is not particularly limited; however, laser light having a wavelength in the range of 375 nm-1.7 μm can be used, and laser light having a wavelength of approximately 800 nm is preferably used.

Although the laser diode 32 is not limited to the following configuration, an example takes a configuration in which a n-electrode 32a, an n-GaAs base 32b, an n-InGaAlP cladding layer 32c, a first InGaAlP guide layer 32d, an active layer 32e which is formed with a multiplex quantum well (InGaP/InGaAlP) or the like, a second InGaAlP guide layer 32f, a p-InGaAlP cladding layer 32g, a p-electrode under layer 32h, and a p-electrode 32j are laminated in this order. On front and back sides of cleavage surfaces of the laser diode 32, reflecting layers 32k and 32l are formed to excite an oscillation by total reflection. An emission center 32m is positioned at the same height as the active layer 32e in the reflecting layer 32k. The n-electrode 32a can be formed with Au or an Au alloy layer having a thickness of approximately 0.1 μm, which is formed on the n-GaAs base 32b. When voltage is applied between the n-electrode 32a and the p-electrode 32j, driving current is generated in the laser diode 32.

In order to detect the strength of the laser light, the laser diode unit 31 includes a photodiode 38. Referring to FIG. 5, the photodiode 38 is formed in the submount 33, and a part of a mounting surface 33a of the submount 33 is replaced with a photo receiving surface 38a. The submount 33 is electrically connected with a cathode electrode (not illustrated) of the photodiode 38. The photodiode 38 includes a p-type semiconductor layer 38b and an n-type semiconductor layer 38c that are formed by doping impurities on the Si base at high density, and an i-type semiconductor layer (intrinsic semiconductor layer) 38d, having a low impurity concentration, that is sandwiched by the semiconductor layers 38b and 38c. The p-type semiconductor layer 38b is positioned on the photo receiving surface 38a side, and is covered with an antireflection film 38e. The p-type semiconductor layer 38b is connected with an anode electrode 38f, and the n-type semiconductor layer 38c is connected with the cathode electrode. The p-type semiconductor layer 38b and the i-type semiconductor layer 38d are covered with the insulation film 33b that is made of $SiO_2$, and the anode electrode 38f is formed thereon. When each photon having larger energy than the band-gap energy of the i-type semiconductor layer 38d is irradiated, a pair of an electron and positive hole is generated in the i-type semiconductor layer 38d due to light absorption. When reverse bias voltage is applied to the photodiode 38, the sweep of each of the electron and the positive hole is in opposite directions due to an electric field. The electron moves toward the n-type semiconductor layer 38c, and the positive hole moves toward the p-type semiconductor layer 38b. Then, photoelectric current is generated. The photoelectric current is detected as output current of the photodiode 38.

The photodiode 38 monitors the laser light in real time. When a stripe type laser diode chip is used, the photodiode 38 may be able to monitor power using light emitted from the opposed side of a front end part (side facing the magnetic head slider 2) of the laser diode 32 used for irradiating the core 15.

Figure 7:
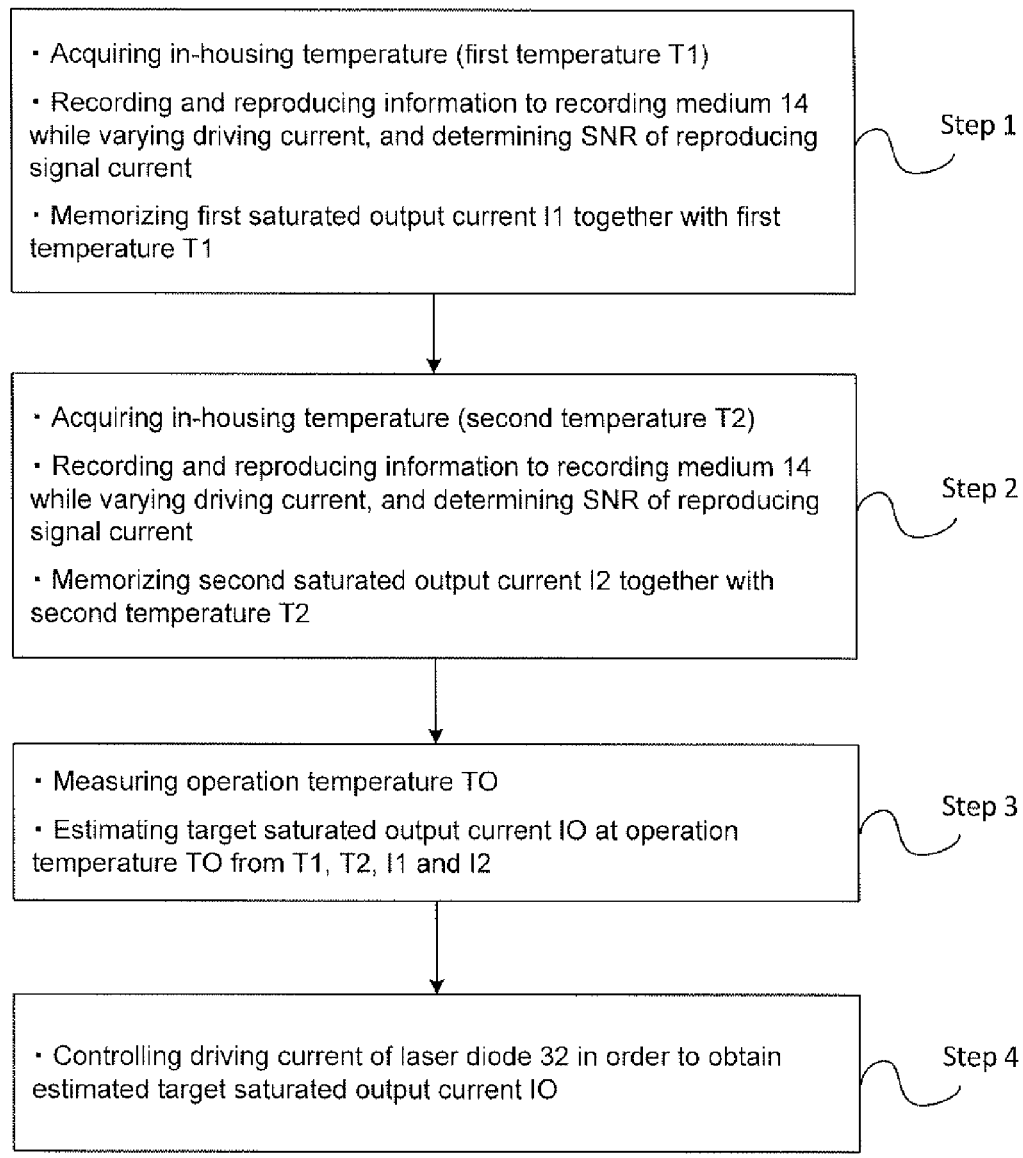
FIG. 7 is a conceptual perspective view of a near field generator and a laser diode.

Next, a control method of the driving current of the laser diode 32 will be explained according to FIG. 7. As described above, since the laser diode 32 has a large variation in light strength, it is desired to adjust the light strength on every laser diode 32 individually and to obtain proper light strength. In the present embodiment, output current of the photodiode 38 in which the proper light strength is obtained is determined beforehand for at least two temperatures, and the driving current of the laser diode 32 in the operating hard disk device 101 is controlled based thereon. Each step, which will be described below, is controlled by the controller 130 in the hard disk device 101. A program that executes these steps is stored in the controller 130. As illustrated in FIG. 1B, the program includes means for controlling information recording/reproducing 130a, means for determining first and second saturated output currents 130b, means for estimating a target saturated output current 130c, and means for controlling the laser diode 130d.

First, Steps 1 and 2 are executed before the hard disk device 101 is shipped or at a first stage at which a user uses the hard disk device 101.

(Step 1) A temperature sensor 114 incorporated in a preamplifier 112 acquires in-housing temperature. The in-housing temperature at this time is set as a first temperature T1. The first temperature T1 is usually room temperature; however it may be any other temperature. Next, by the means for controlling information recording/reproducing 130a, information recording/reproducing is performed on the recording medium 14, maintaining the driving current of laser diode 32 at a constant value. When the driving current is supplied to the laser diode 32, laser light is emitted from the laser diode 32, and the laser light propagates through the waveguide 17 as the propagation light 40. The near field generator 41 generates the near field light from this propagation light at the air bearing surface S. Simultaneously, the magnetic flux is supplied from the main pole 10, and information is recorded to the recording medium 14 having a reduced coercive force. Any type of information is applicable to record as long as it is possible to evaluate a signal to noise ratio (SNR), which will be described later. Simultaneously at this time, the photodiode 38 measures the light strength of the laser light. Specifically, the output current of the photodiode 38 that corresponds to the light strength of the received light is detected. Furthermore, the MR element 4 reproduces the recorded information, the reproducing signal current of the MR element 4 is analyzed, and the SNR of the reproducing signal current is determined.

Figure 8A:
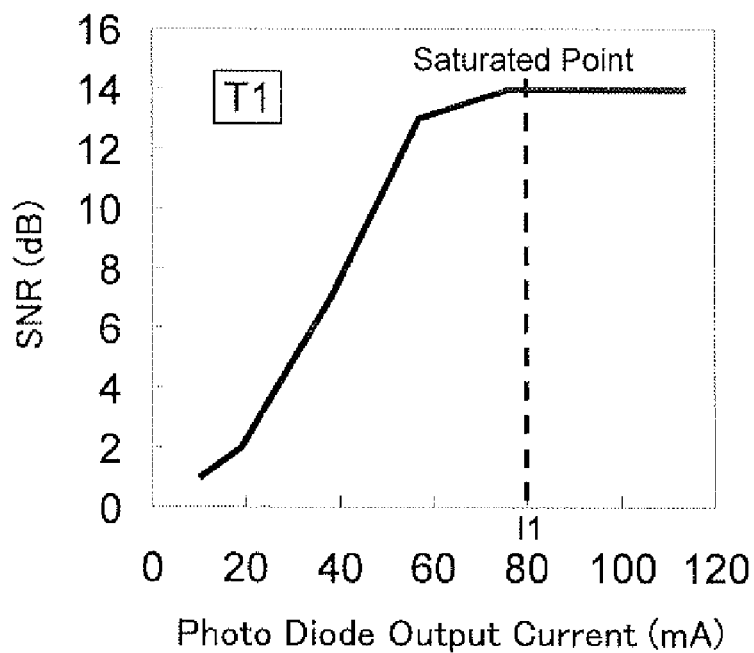
FIG. 8A is a graph illustrating a relationship between photodiode output current and the SNR of a reproducing signal current.

Next, the above operation is repeated while the driving current is varied. It is desirable that the driving current is gradually increased; however, it may be also gradually decreased. As a result, the relationship between the output current of the photodiode 38 and the SNR is determined as illustrated in FIG. 8A. The SNR increases as the output current of the photodiode 38, i.e., the light strength, increases; however the SNR becomes saturated as the output current of the photodiode 38 continues to increase. The means 130b determines the output current of the photodiode 38 at this time as a first saturated output current I1. The SNR is maintained to an almost constant value thereafter even though the output current is increased.

The SNR saturated point is detectable by various methods. For example, when a change ratio of the SNR with respect to the output current is less than a constant threshold value, it is judged that the SNR has reached the saturated point. Alternatively, on a graph where the horizontal axis is the output current and a vertical axis is the SNR, a range having a constant width is set on the horizontal axis. The average value of the SNR with respect to each range having the width is calculated as shifting the range having the constant width. Then, when the change ratio of the average value of the SNR is less than the constant threshold value, it is judged that the SNR has reached the saturated point.

A reproducing operation by the MR element 4 and an acquisition of the SNR based thereon can be performed simultaneously after the recording operation is performed with respect to various driving currents. In any manner, combinations of the output current of the photodiode 38 and the SNR of the reproducing signal current of the MR element 4 with respect to various driving currents are obtained, and eventually a relationship illustrated in FIG. 8A is obtained. The controller 130 stores the first saturated output current I1 and the first temperature T1 in a memory in the controller 130.

Figure 8B:
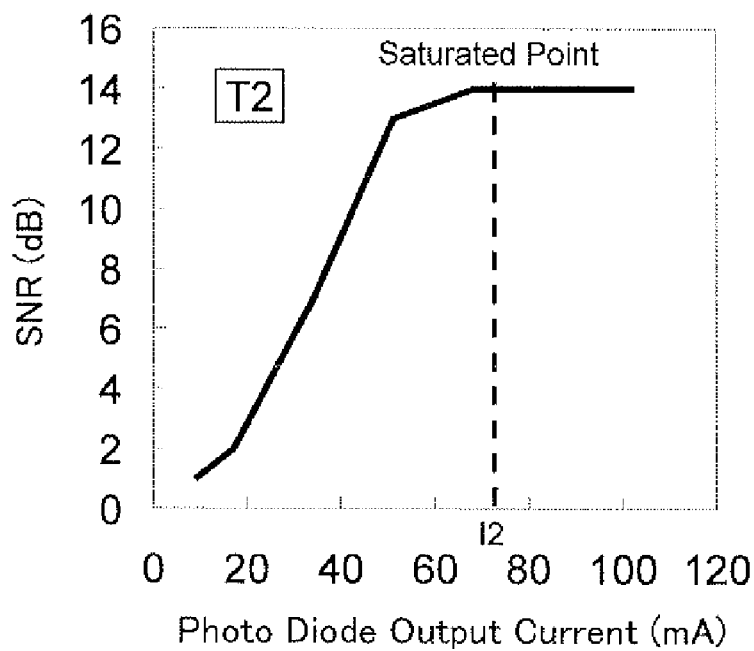
FIG. 8B is a graph illustrating a relationship between photodiode output current and the SNR of a reproducing signal current.

(Step 2) When the in-housing temperature is the second temperature T2 that is different from the first temperature T1, the same operation as Step 1 is performed. The second temperature T2 is not limited in particular as long as it is different from the first temperature T1; however, a typical T2 is a temperature when the hard disk device 101 runs for a period of time and the in-housing temperature is increased above the first temperature T1 due to heat generation from the spindle motor 123 and the like. As in Step 1, a relationship of the output current of the photodiode 38 and the SNR as illustrated in FIG. 7B is obtained, and the output current of the photodiode 38 when the SNR is saturated is determined. The controller 130 determines the output current of the photodiode 38 at this point as the second saturated output current I2. The controller 130 stores the second saturated output current I2 and the second temperature T2 in the memory in the controller 130. FIG. 8B illustrates an example where the second temperature T2 is higher than the first temperature T1, and the second saturated output current I2 is smaller than the first saturated output current I1 because laser power that is necessary for the SNR to saturate is small.

As a result, Steps performed before the hard disk device 101 is shipped or at the first stage at which a user uses the hard disk device 101 are completed.

(Step 3) Next, the hard disk device 101 is activated according to normal usage. The in-housing temperature is not constant while the hard disk device 101 is in operation, and is varied corresponding to an external temperature variation or an operation status of the hard disk device 101. Therefore, it is desirable to perform this step repeatedly and periodically at regular intervals.

Specifically, first, the in-housing temperature (hereafter, referred to as operation temperature TO) is measured by the temperature sensor 114. The controller 130 regularly reads a measured signal supplied continuously from the temperature sensor 114. Next, the means 130c of the controller 130 estimates a target saturated output current IO at the operation temperature TO from the measured operation temperature TO, the first and second temperatures T1 and T2, and the first and second saturated output currents I1 and I2. Although there are various estimating methods, the simplest one estimates the target saturated output current IO at the operation temperature TO as $$IO = \frac{I2 - I1}{T2 - T1}(TO - T1)$$

Figure 9:
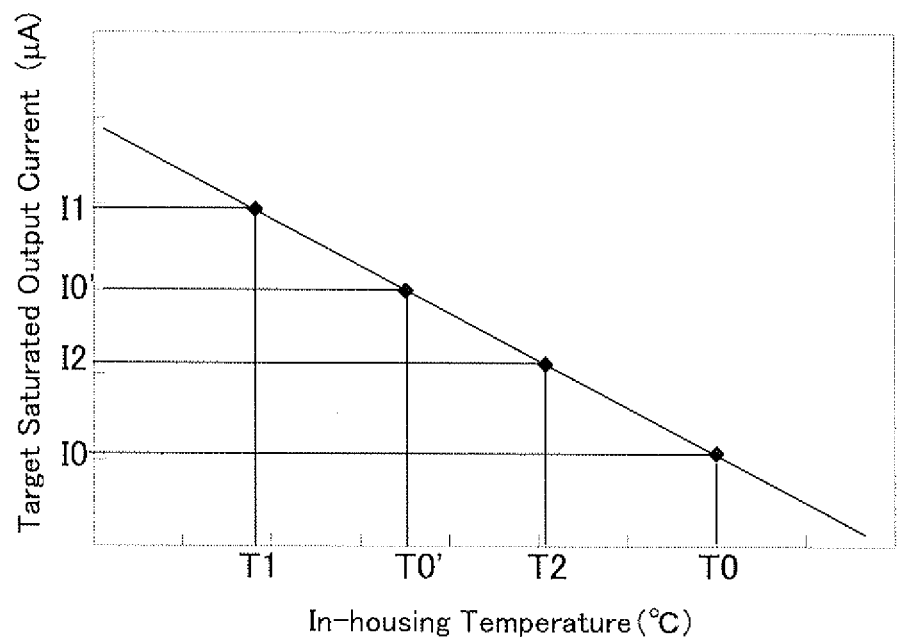
FIG. 9 is a graph illustrating a relationship between in-housing temperature and a target saturated output current of the photodiode.

This method is premised on a rule that the target saturated output current is approximated by a linear function with respect to the in-housing temperature as illustrated in FIG. 9. In other words, when the first and second temperatures T1 and T2, and the first and second saturated output currents I1 and I2 that correspond thereto are known, the target saturated output current IO at the operation temperature TO is determined by interpolation or extrapolation. When the operation temperature TO is higher than the first temperature T1 and the second temperature T2, the target saturated output current IO is determined by the extrapolation. When the operation temperature TO' is at the middle of the first temperature T1 and the second temperature T2, the target saturated output current IO' is determined by the interpolation as illustrated in FIG. 9. Usually, sufficient estimation accuracy can be obtained by such a linear approximation. The inventor of the present application has determined that a relationship between the laser power and the temperature of the recording medium is linear in a range of the laser power used by the thermally-assisted recording. The relationship between the laser power and the output current of the photodiode 38 is also almost linear. Therefore, in order to reduce the laser power for heating the recording medium by an increased amount of an ambient temperature when the ambient temperature (the in-housing temperature) increases, the amount of adjustment is obtained by linear approximation.

The estimation method of the target saturated output current IO is not limited to the above; but various methods are applicable. For example, the saturated output current is determined at three or more temperatures beforehand, and the target saturated output current is linearly approximated by the least squares method. Alternatively, the saturated output current is determined at three or more temperatures beforehand, and the relationship of the in-housing temperature and the target saturated output current is curve-approximated.

(Step 4) In order to obtain the estimated target saturated output current IO, the driving current of the laser diode 32 is controlled by the means for controlling laser diode 130d. As a result, the largest SNR is obtained, and an increase in a track width due to excessive laser power is prevented.

Step 4 can be also executed only when the in-housing temperature widely varies. For example, the in-housing temperature is measured by the temperature sensor 114 at regular intervals, and the measured result is stored in the memory. Then, when a difference with the last measured result is under a predetermined threshold value, it is possible to skip this step.

As described above, the increase in the recording track width is effectively prevented by adjusting the driving current of the laser diode 32 corresponding to the in-housing temperature. Herein, an example will be described where the largest SNR is obtained when the recording medium surface is heated to 300° C. and where the first temperature T1 is set at room temperature (25° C.). When the first temperature T1 is room temperature, a heating amount (approximately 40 mW of a laser diode front end surface output as one example) is required to increase 275° C. by temperature. When the above-mentioned learning process is performed, a saturated output current is determined to increase the temperature by 275° C. When the in-housing temperature is increased to approximately 60° C., the temperature increase of 240° C. (approximately 35 mW of the laser diode front end surface output as one example) is required, and the power must be reduced by approximately 13%. However, when the adjustment of the laser power is not performed by which the saturated output current corresponding to the temperature increase of 240° C. is obtained, the recording track width is widened because the light strength is too strong. According to an experiment that the inventor of the present application executed, when the recording power is increased by approximately 10%, the track width is increased by 40% and more from 80 nm to 115 nm. The output variation of approximately 10% is an applicable range for a specification of a normal compact disk (CD) driving device and a normal digital versatile disk (DVD) driving device. On the other hand, such an output variation is not applicable for the hard disk device. It is determined that the output variation should be suppressed to an output variation of approximately ±1%, which has a single digit and good accuracy. According to the present invention, it is possible to suppress to such a small output variation.

Figure 10A:
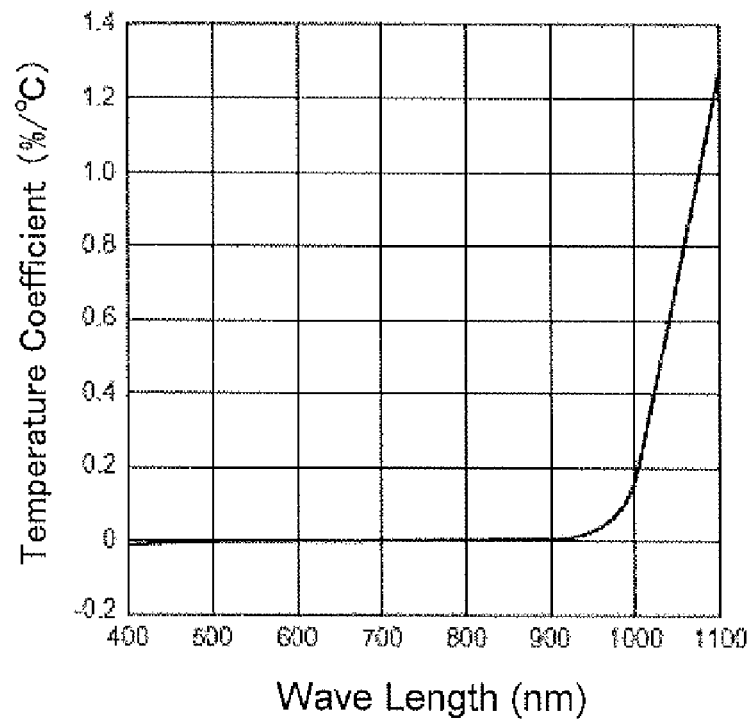
FIG. 10A is a graph illustrating an example of a temperature coefficient of the photodiode.
Figure 10B:
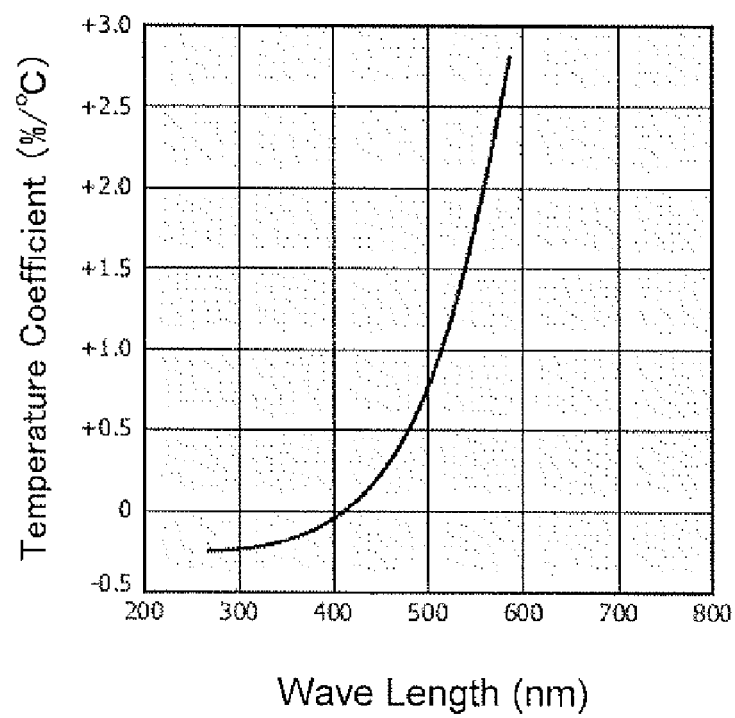
FIG. 10B is a graph illustrating an example of the temperature coefficient of the photodiode.

The photodiode 38 is desired to have a positive temperature coefficient with respect to a photoreception sensitivity in a wavelength area of the laser light emitted from the laser diode 32. Examples of the temperature coefficient are illustrated in FIGS. 9A and 9B. These figures show the examples of a published characteristics graph of commercially-supplied photodiodes. The photodiode 38 of the present embodiment is not limited to the above-described photoreception characteristics. In FIG. 10A, the temperature coefficient is a positive value around where the wavelength is slightly more than 900 nm. In FIG. 10B, the temperature coefficient is a positive value around where the wavelength is slightly more than 400 nm. The reasons why the temperature coefficient with respect to the photoreception sensitivity is desired to be positive will be explained below.

When the temperature coefficient with respect to the photoreception sensitivity is positive, the photoreception sensitivity of the photodiode 38 is increased under a high temperature environment. Therefore, when the laser diode 32 is controlled to emit the laser light having a constant output, even though the laser diode 32 outputs a constant power, it is incorrectly judged that output is too large, and it is controlled to decrease the output. From such a viewpoint, normally, a photodiode of which the temperature coefficient of the photoreception sensitivity is nearly zero is used for the CD driving device or the DVD driving device.

A problem at this point is that the temperatures of the photodiode 38 and the recording medium 14 do not correspond to the in-housing temperature measured by the temperature sensor 114 during operation. As described above, the temperature sensor 114 is usually incorporated in the preamplifier 112 and is positioned away from the photodiode 38 and the recording medium 14. A spindle motor 123 is an example of a heating source in the hard disk device 101. The heat of the spindle motor 123 is transferred to the recording medium 14 due to heat conduction, and the recording medium 14 is heated. Since the photodiode 38 is disposed in the magnetic head, the photodiode 38 is also heated by the recording medium 14 in which the temperature is increased. On the other hand, the preamplifier 112 is rarely affected by the heat of the spindle motor 123.

Usually, the learning process is performed at the room temperature and when a certain time passes after start-up of the hard disk device 101, so that effects due to the heat generation of the spindle motor 123, etc. are small. Therefore, the temperatures of the photodiode 38 and the recording medium 14, and the in-housing temperature measured by the temperature sensor 114 substantially correspond to one another or deviate only slightly even when they do not correspond. On the other hand, when additional time passes after the start-up of the hard disk device 101, the effects due to the heat generation of the spindle motor 123, etc. become large. Therefore, the temperatures of the photodiode 38 and the recording medium 14 become normally higher than the in-housing temperature measured by the temperature sensor 114. As a matter of course, when the temperature sensor 114 is positioned close to the photodiode 38 and the recording medium 14 to the extent possible, generation of the temperature difference is prevented. However, this is not practical because the magnetic head 1 needs to access a predefined position of the recording medium 14 at an ultrahigh speed, and placement to such a temperature sensor 114 in the magnetic head 1 itself has a large effect on the access speed. Even though the temperature sensor 114 is attached to the head gimbal assembly 105 or the arm 103, the same problem occurs. Therefore, even when the temperature sensor 114 is disposed to a position other than the preamplifier 112, it is difficult to dispose the temperature sensor 114 close to the photodiode 38 and the recording medium 14, and it is difficult to prevent the generation of the temperature difference. It is considered that the difference between the temperature measured by the temperature sensor 114 and the temperature of the photodiode 38 and the surface of the recording medium 14 is from a few degrees Celsius to ten and a few degrees Celsius. In other words, the target saturated output current IO, which is set corresponding to the operation temperature TO measured by the temperature sensor 114, is significantly high with respect to the photodiode 38 and the recording medium surface.

When the temperature of the periphery of the recording medium 14 is locally increased, the driving current of the laser diode 32 must be decreased to prevent an increase in the track width. However, the driving current of the laser diode 32 is controlled such that the output current of the photodiode 38 corresponds to the target saturated output current IO estimated at Step 4. Also, as described above, since the target saturated output current IO is significantly high, as long as the above-described controlling method is used, the driving current of the laser diode 32 is not decreased. In order to decrease the driving current of the laser diode 32, the measured value of the temperature sensor 114 should be moved closer to the temperature of the photodiode 38 and the recording medium surface. However, such an adjustment is also not practical because of a restriction of the installation location of the temperature sensor 114. Therefore, the temperature of the temperature sensor 114 cannot be corrected, and an adjustment of the recording power cannot be conducted. The learning information itself acquired at Step 2 may be corrected; however, the temperature information of the photodiode 38 and the recording medium 14 is needed, and the same problem occurs.

In the present embodiment, in order to solve the above-described problem, the photodiode 38 of which the temperature coefficient of the photoreception sensitivity is positive is used. Since the temperature coefficient of the photoreception sensitivity is positive, the photoreception sensitivity of the photodiode 38 where the temperature is locally increased is increased. In other words, an output current that is larger than the output current corresponding to the actual light strength is output, and the same effect as decreasing the target saturated output current IO estimated at Step 4 is spriously obtained. Also in this case, the controller 130 controls the driving current of the laser diode 32 such that the output current of the photodiode 38 corresponds to the target saturated output current IO estimated at Step 4, so that the driving current is automatically suppressed.

Figure 11:
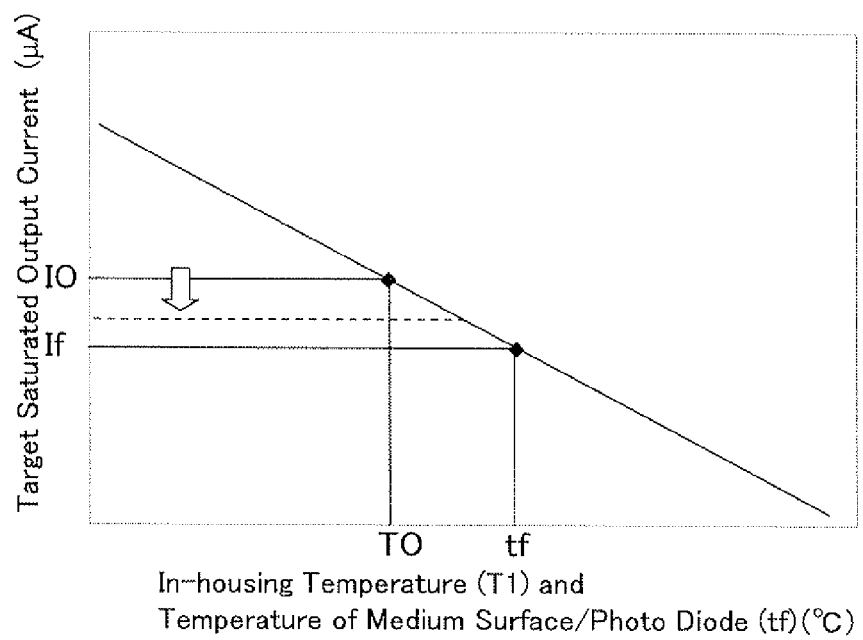
FIG. 11 is a conceptual view illustrating effects in which a photodiode having a positive temperature coefficient is used.

Referring to FIG. 11, the output current IO corresponding to the operation temperature TO is set at Step 4. Herein, the temperatures of the photodiode 38 and the surface of a recording medium are set to tf. Since the temperature tf is larger than the ambient temperature in the housing, i.e., the measured value TO by the temperature sensor 114, the output current of the photodiode 38 must correspond to the temperature tf, and must be an output current. If smaller than the output current IO. The controller 130 controls the driving current of the laser diode 32 such that the output current of the photodiode 38 becomes IO. However, since the temperature coefficient is positive, the output current reaches IO with the small driving current, and the laser power to be applied is suppressed in a proper range. In other words, the output current of the photodiode 38 is controlled to IO when the temperature coefficient is either zero or positive. However, the driving current that provides IO is smaller when the temperature coefficient is positive. As a result, as illustrated by the arrow in the figure, the same effect occurs as when the target saturated output current IO is decreased. As described above, without adjusting the measured result by the temperature sensor 114 and the result of the learning information, the application of the excessive laser power is prevented and the increase in the recording track width is suppressed.

The problem of the increase in the recording track width may occur on a CD and/or DVD that usually incorporates the photodiode of which the temperature coefficient with respect to the photoreception temperature is zero. However, since the CD and/or DVD adopts a design that has a large margin with respect to a variation of the recording track width, a large problem does not occur. Also, since the recording medium of the CD/DVD is heated to 600° C. or more, the ambient temperature variation on the order of tens of degrees Celsius is ignored. On the other hand, of the hard disk device, the ambient temperature variation on the order of tens of degrees Celsius must be carefully addressed. For this, the photodiode that has a positive temperature coefficient with respect to the photoreception sensitivity is preferably utilized in the present invention.

The temperature coefficient of the photodiode 38 preferably fulfills the following relationship. The recording medium 14 is heated from a situation where the surface temperatures of the recording medium 14 are t1 and t2 (additionally, t1<t2 ) to the surface temperature of the recording medium 14 when the SNR is saturated with respect to the increase in the output current of the photodiode 38. Laser light outputs that are required to heat the recording medium 14 are respectively e1 and e2, a temperature dependent coefficient x of the laser light output is x=(1−e2/e1)/(t2−t1) , and a temperature coefficient of the photodiode 38 is y (%/° C.). At this point, it is desired that the temperature coefficient of the photodiode 38 is selected to fulfill a relationship of |x+y|<|x|. This relational expression shows a total of the temperature dependency is more decreased than when the temperature coefficient of the photodiode 38 is zero as long as the temperature coefficient of the photodiode 38 is selected properly.

The above-described relational expression that is applied to the above-described example is as follows. First, since t1=25° C., t2=60° C., e1=40 mW, and e2=35 mW, the temperature dependent coefficient x of the laser light output becomes −0.37%/° C. While the temperature coefficient y of the photodiode 38 is varied from 0.8 to −0.1, the total of the temperature dependency is determined as x+y, resulting in the following chart. A standard value is set as x+y in the case of the temperature coefficient y=0. A range of y, of which an absolute value is less than the standard value, is from 0.05 to 0.7, and more preferably from 0.2 to 0.5. From the described thing, with the condition of the example, the temperature coefficient of the photodiode 38 is desired to be in a range of +0.05%/° C. or more and +0.7%/° C. or less, and more preferably in a range of +0.2%/° C. or more and +0.5%/° C. or less.

TABLE 1

| Temperature dependent coefficient x of laser power (%/° C.) | Temperature coefficient y of photodiode (%/° C.) | Temperature coefficiency x + y, which both are concerned (%/° C.) | |
|---|---|---|---|
| −0.37 | 0.8 | 0.43 | |
| −0.37 | 0.7 | 0.33 | Preferable |
| −0.37 | 0.6 | 0.23 | Preferable |
| −0.37 | 0.5 | 0.13 | More preferable |
| −0.37 | 0.4 | 0.03 | More preferable |
| −0.37 | 0.3 | −0.07 | More preferable |
| −0.37 | 0.2 | −0.17 | More preferable |
| −0.37 | 0.1 | −0.27 | Preferable |
| −0.37 | 0.05 | −0.32 | Preferable |
| −0.37 | 0 | −0.37 | Standard value |
| −0.37 | −0.1 | −0.47 | |

A description of the preferred embodiment according to the present invention was given above in detail. However, it should be appreciated that a wide variety of alterations and modifications are possible as far as they do not depart from the spirit and scope of the attached claims.

What is claimed is:

1. A hard disk drive, comprising:
   a recording medium;
   a magnetic head including a laser diode that emits laser light, a photodiode that measures light strength of the laser light emitted from the laser diode, a near field generator that generates near field light from the laser light emitted from the laser diode at an air bearing surface facing the recording medium, a main pole for recording that is disposed adjacent to the near field generator and having a tip part positioned at the air bearing surface, and a reproducing element;
   a housing incorporating the recording medium and the magnetic head;
   a temperature sensor that measures temperature inside the housing; and
   a controller, wherein
      the controller includes:
         means for recording information to the recording medium by the main pole as the near field generator generates near field light, while varying driving current of the laser diode and observing output current of the photodiode;
         means for reproducing the recorded information with the reproducing element and for obtaining reproducing signal current;
         means for determining one output current of the photodiode as a first saturated output current, the one output current being defined where temperature measured by the temperature sensor is a first temperature and where signal-to-noise-ratio (SNR) of the reproducing signal current of the reproducing element is saturated with respect to an increase in the output current of the photodiode;
         means for determining another output current of the photodiode as a second saturated output current, the another output current being defined where temperature measured by the temperature sensor is a second temperature, which is different from the first temperature, and where SNR of the reproducing signal current of the reproducing element is saturated with respect to an increase in the output current of the photodiode;
         means for estimating a target saturated output current at operation temperature from the operation temperature measured by the temperature sensor during the hard disk device operation, the first and second temperatures, and the first and second saturated output currents; and
         means for controlling the laser diode that controls the driving current of the laser diode in order to obtain the estimated target saturated output current.

2. The hard disk device according to claim 1, wherein the means for estimating the target saturated output current estimates the target saturated output current IO as $$IO = \frac{I2 - I1}{T2 - T1}(TO - T1),$$

where the first and second temperatures are T1 and T2, the first and second saturated output currents are I1 and I2, and the measured operation temperature is TO.

3. The hard disk device according to claim 1, wherein the photodiode has a positive temperature coefficient with respect to photoreception sensitivity in a wavelength area of the laser light emitting from the laser diode.

4. The hard disk device according to claim 3, wherein the temperature coefficient y of the photodiode is selected so as to fulfill a relationship of |x+y|<|x|, where laser light outputs are e1 and e2 which are required to heat the recording medium from a situation where a surface temperatures of the recording medium are t1 and t2 (herein, t1<t2 ) up to another situation where the SNR is saturated with respect to the increase in the output current of the photodiode, a temperature dependent coefficient x of the laser light output is x=(1−e2/e1)/(t2−t1), and a temperature coefficient of the photodiode is y (%/° C.).

5. A method for controlling a hard disk drive that includes:
a recording medium;
a magnetic head including a laser diode that emits laser light, a photodiode that measures light strength of the laser light emitted from the laser diode, a near field generator that generates near field light from the laser light emitted from the laser diode at an air bearing surface facing the recording medium, a main pole for recording that is disposed adjacent to the near field generator and that has a tip part positioned at the air bearing surface, and a reproducing element; and
a housing incorporating the recording medium, the method comprising:
recording information to the recording medium by the main pole as the near field generator generates near field light while varying driving current of the laser diode, and monitoring the output current of the photodiode with respect to light strength of the laser light where temperatures inside the housing are the first temperature and the second temperature that is different from the first temperature respectively;
reproducing the recorded information by the reproducing element and obtaining reproducing signal current;
determining the output currents of the photodiode as first and second saturated output currents, the output currents being defined where signal-to-noise-ratio (SNR) of the reproducing signal current of the reproducing element at the first and second temperatures are respectively saturated with respect to an increase in the output current of the photodiode;
measuring the temperature inside the housing during the hard disk device operation as operation temperature;
estimating a target saturated output current at the operation temperature from the operation temperature, the first and second temperatures, and the first and second saturated output currents; and
controlling the driving current of the laser diode in order to obtain the estimated target saturated output current.

* * * * *